Dec. 3, 1946.   C. R. PATON   2,411,936
COOLING SYSTEM
Filed Aug. 5, 1943   3 Sheets-Sheet 1

Inventor
Clyde R. Paton
By Blackmar, Spencer & Flint
Attorneys

Dec. 3, 1946.  C. R. PATON  2,411,936
COOLING SYSTEM
Filed Aug. 5, 1943   3 Sheets-Sheet 3
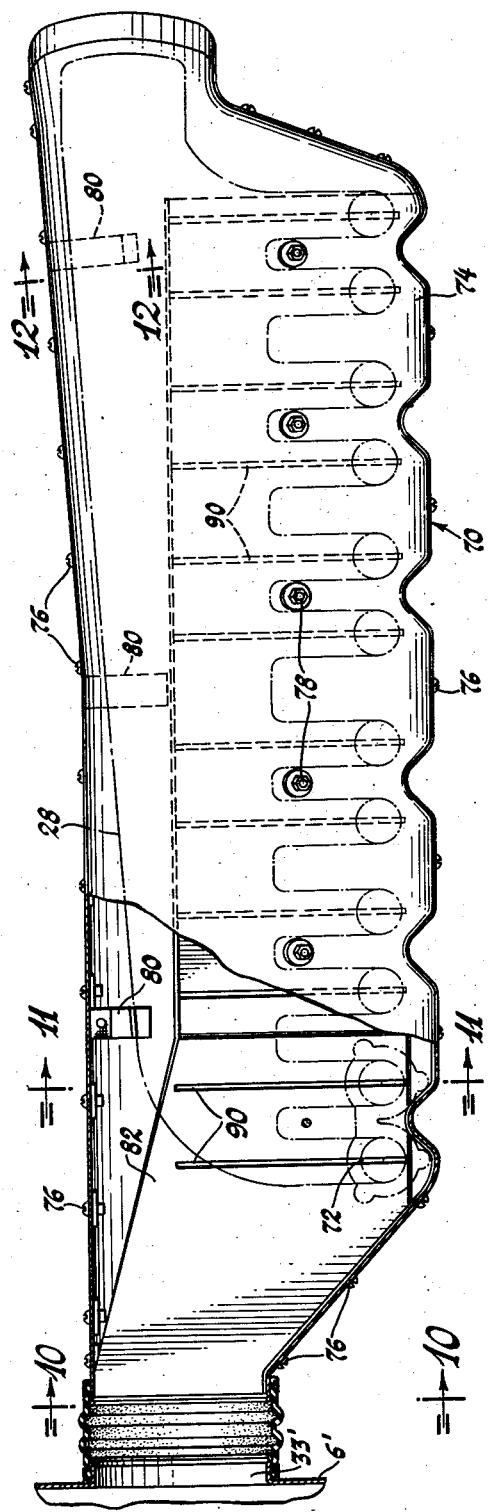
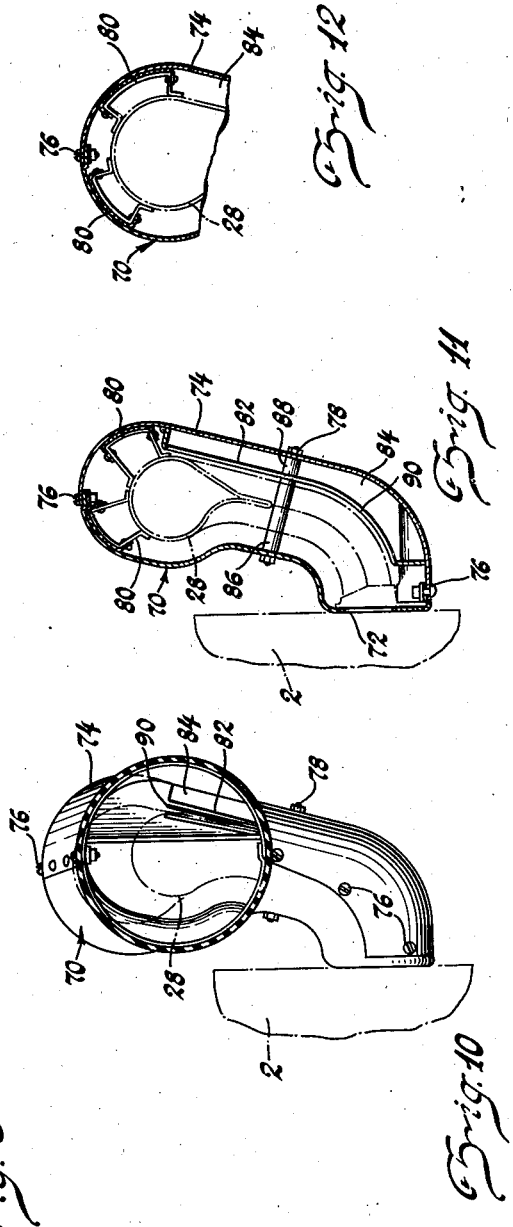
Inventor
Clyde R. Paton
By Blackmore, Spencer & Hunt
Attorneys Patented Dec. 3, 1946

2,411,936

UNITED STATES PATENT OFFICE 2,411,936

COOLING SYSTEM

Clyde R. Paton, Birmingham, Mich., assignor to General Motors Corporation, Detroit, Mich., a corporation of Delaware Application August 5, 1943, Serial No. 497,423

3 Claims. (Cl. 123—171)

This invention relates to cooling means and more particularly to auxiliary cooling means for cooling parts of aircraft engines.

In any internal combustion engine the primary object of cooling is to conduct the heat away from the cylinder walls and head with sufficient rapidity to prevent their being raised above a critical temperature. With this object most engines are provided with a primary cooling system to accomplish this. There are two main systems: air-cooled, which utilizes cooling fins to dissipate the heat to air forced thereover; or liquid-cooled, in which water or some other liquid flows through cooling channels in the casings around the combustion chamber. There are in each case, however, other parts of the engine and its associated parts that it may be necessary to cool and which are not satisfactorily cooled by the main or primary cooling system, especially where the engine is mounted within a relatively close housing and any auxiliary heat removal will aid in engine operation. For example, the pipes carrying the exhaust gases to the atmosphere acquire a great deal of heat therefrom and no particular cooling means is usually provided therefor. Also, the temperature in the vicinity of the spark plugs may be excessive and the performance of the plugs may be improved by cooling this area.

It is therefore an object of my invention to provide auxiliary cooling means for an engine.

It is a further object of my invention to provide auxiliary cooling means for the exhaust means.

It is a still further object of my invention to provide auxiliary cooling means for cooling the spark plugs.

It is a still further object of my invention to provide auxiliary cooling means to lower the operating temperature of various parts of an engine.

With these and other objects in view, which will become apparent as the specification proceeds, the embodiments of my invention will be best understood by reference to the following specification and claims and the illustrations in the accompanying drawings, in which:

Figure 9 is an enlarged sectional view taken on line 9—9 of Figure 8; and

Figure 1:
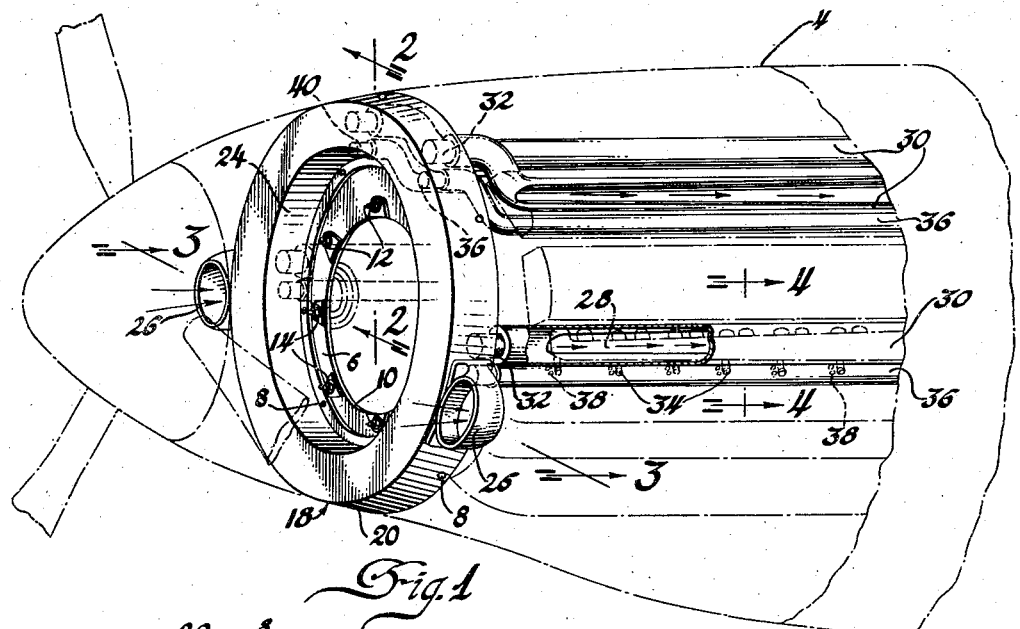
Figure 1 is a perspective view of my construction as applied to an aircraft engine.

Figures 10, 11 and 12 are sectional views taken on lines 10—10, 11—11, and 12—12, respectively, of Figure 9.

Referring now more particularly to the drawings, there is shown in dot-and-dash outline an engine 2 of the liquid-cooled type which is mounted in a housing 4 also shown in dot-and-dash outline, which housing may be the front portion of a plane's fuselage. This housing is roughly of torpedo shape. The forward portion is tapered and the nose of the torpedo section is provided by the propeller hub also shown in dot-and-dash lines.

The forward portion of the housing or cowling is supported from the front of the engine by means of a ring 6 and therefore it must be a fairly strong and rigid assembly. The ring 6 has its outer periphery secured to the inner surface of the cowling by rivets 8 or similar securing means. The forward portion of the engine projects through the center opening 10 in the ring and is secured thereto by a plurality of bolts 12 which extend from the engine housing through openings in the ring and are secured thereto by nuts 14. The bolts 12 are resiliently mounted with respect to the ring by rubber washers 16 on each side of the ring. This will reduce the vibration transmitted to the fuselage from the engine. The ring 6 acts as a bulkhead in the housing.

An annular toroidal member 18 is secured to the ring 6 and forms therewith a circular hollow chamber. One side 20 of the member 18 is parallel with the cowling and is secured thereto by the rivets 8; a second side 22 extends radially inward; and the third side 24 extends axially back and is secured to the ring 6.

The cowling is provided with a pair of spaced openings through which project ears or scoops 26 integral with the annular torus which face forward and force air into the chamber when the plane moves through the air or the propeller rotates. Along the sides and top of the engine are a plurality of longitudinally extending exhaust lines 28 which conduct the hot gases from the cylinders to the discharge point at the rear. Of necessity these lines operate at very high temperatures and it is desirable to eliminate this heat from the engine area. A collector shrowd 30 is therefore mounted around, but spaced a short distance from, each exhaust line to enclose the same for its length along the engine, but permit coolant leakage at points where the manifold is connected to the cylinder block. The forward ends of the shrowds 30 are brought into juxtaposition with the toroidal chamber and are connected into the same by flexible tubing 32 fitted to openings 33. Thus air scooped into the chamber may flow back through the shrowds 30 and cool the exhaust lines.

There are also located in a series of longitudinal rows on the engine a set of spark plugs to ignite the gasoline mixture in a series of cylinders. These are shown at 34 and are located adjacent the exhaust lines. A hollow tube 36 is mounted adjacent each row of spark plugs which has a series of openings 38 therein adjacent each plug so that air will blow on the plug to cool it off. As in the previous case, the forward end of the tube 36 is connected to the annular air chamber by flexible tubing 40 fitted to openings 41. There are as many exhaust shrowd tubes and spark plug tubes as there are exhaust lines and rows of spark plugs.

Figure 2:
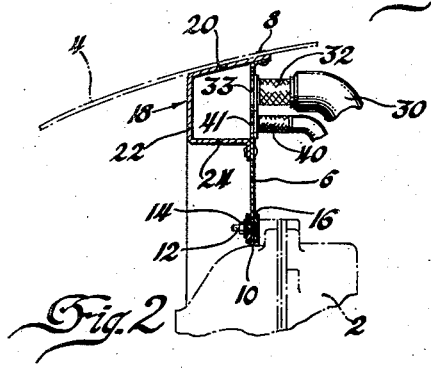
Figure 2 is a sectional view taken on line 2—2 of Figure 1.
Figure 3:
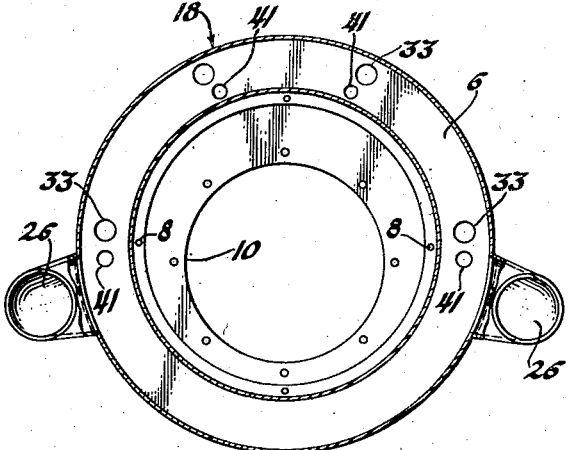
Figure 3 is a sectional view taken on line 3—3 of Figure 1.
Figure 4:
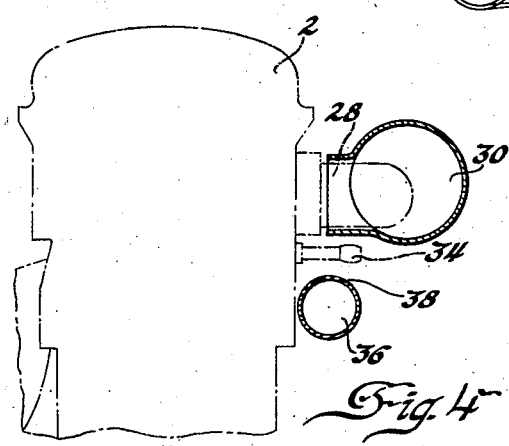
Figure 4 is a sectional view taken on line 4—4 of Figure 1.

Therefore, with air entering the ears or scoops 26 to provide a certain air pressure within the annular chamber, air is provided to flow back through the tubes 30 and 36 to cool the exhaust lines and the spark plugs and therefore permit the engine to operate at a cooler temperature and lengthen the life of the parts. Since the annular chamber is substantially of square cross section, as shown in Figure 2, it is strong mechanically and assists considerably in strengthening the fuselage or cowling.

Figure 5:
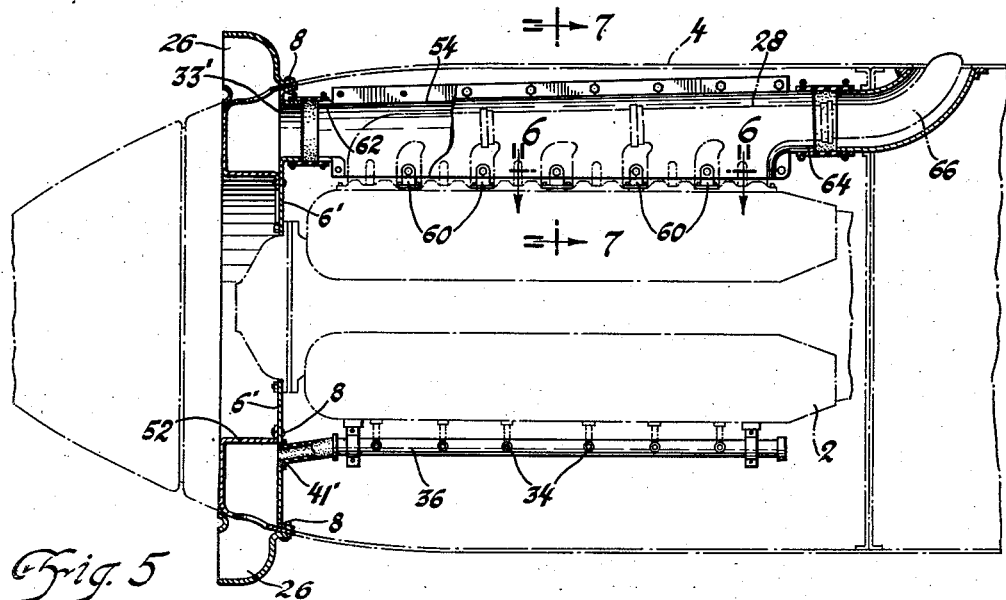
Figure 5 is a top plan view showing a modified form of my invention parts being broken away and shown in section.
Figure 6:
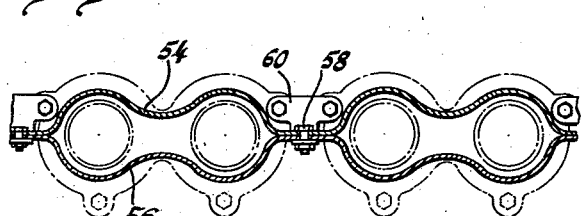
Figure 6 is a sectional view taken on line 6—6 of Figure 5.
Figure 7:
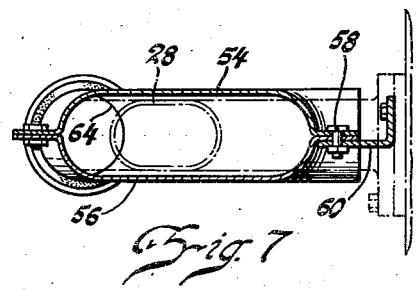
Figure 7 is a sectional view taken on line 7—7 of Figure 5.
Figure 8:
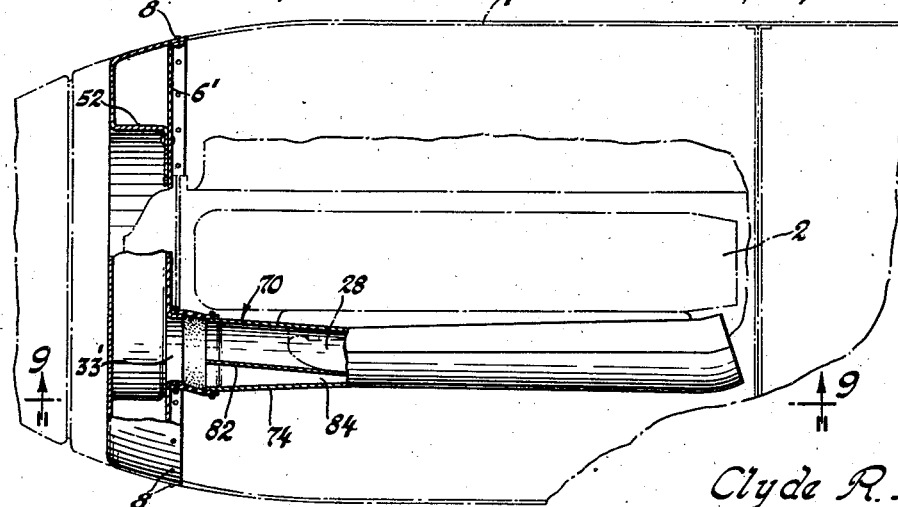
Figure 8 is a side elevation of a further modified form of my invention.

Referring now to the form of invention shown in Figures 5, 6 and 7, there is provided as before the engine 2 located within the housing 4, the latter in this instance terminating in a plane approximately at the forward end of the engine. An annular plate 6' secured to and supported by the engine is flanged over at its outer periphery and secured to the inner surface of the housing 4 by rivets 8. An annular toroidal member 52 similar to member 18 is secured around the outer edge of plate 6' by the same rivets 8. The angular member 52 is secured to the plate 6' and has a cylindrical portion which extends out axially of the engine and then parallel to the plate 6' until its diameter is approximately that of the housing. The outer periphery extends back toward the outer edge of plate 6' and forms with the plate 6' an annular air intake chamber. Scoops 26' are supported outside the housing as before to force air into the chamber.

The plate 6' has openings 41' therein for the connection of tubes 36 to cool the spark plugs 34 and also larger openings 33' to provide air for cooling the exhaust lines. In this modification the enclosure conducting the air around the exhaust lines is formed of two halves 54 and 56 which are so stamped as to conform to an upper and lower half around the exhaust manifold. They are so stamped that they may be secured together between pairs of exhaust lines by bolts 58 and short brackets 60 extending out from the face of the motor block are connected thereto by the same bolts to support the assembly on the side of the engine. The front and rear portions of the enclosure are drawn into cylindrical shape such as 62 and 64 to be secured to the flanged opening 33' and enclose the exhaust pipe 66 respectively. In this manner air flowing in through opening 33' will wipe over the whole of the exhaust manifold up to within a short distance of the engine and pass out over the exhaust pipe to cool the same.

The modification shown in Figures 8–12 inc. has the same annular collection chamber formed of annular plate 6' and angular ring 52, the scoops 26 not showing in this vertical section. Air is therefore collected and introduced into this chamber for the distribution to the various parts as before. The enclosing chamber for the exhaust manifold however in this instance has two separate chambers, one chamber enclosing directly the exhaust manifold and the second being in the nature of a bypass for introducing cool air to those parts which tend to run hottest.

This enclosure consists of one stamping 70 adapted to be secured to the engine block at the manifold and having openings 72 therein through which the manifold stacks may pass. This portion is stamped to conform to the shape of the manifold in a vertical plane as best shown in Figure 11 and extends up over the same to conduct air into proximity with the exhaust manifold but let it circulate past. A second half 74 completes the enclosure, the two halves being held together by cap screws 76 spaced along the seams and by spacer bolts 78 through the center portion. Within the top of the enclosure formed by these two halves there are provided at suitable points resilient spacers 80 adapted to press against the exhaust manifold and the inside of the enclosure.

The hottest points in the exhaust manifold are of course the points where the hot gases are introduced from the combustion chambers or that point adjacent openings 72 called the stacks. Therefore it would be advantageous to introduce additional cooling fluid at these points. Also, as the air or other cooling fluid flows back within the enclosure, it is heated so that by the time it reaches the rear it does not have the same heat absorbing ability that it had farther to the front. It would therefore be advantageous to introduce more air toward the rear. These advantages are provided in the present design by including a baffle 82 which encloses a bypass chamber 84 to one side of the exhaust manifold. This is held in place by the spacer bolts 78 which carry clamping spacer portions 86 and 88 to clamp the baffle.

Cut into the baffle 82 at points lying opposite the exhaust manifold stacks are slots 90 so that air in the bypass may flow through the slots directly onto the stacks and of course at the rear end the baffle wall ceases and the air may flow over the whole exhaust manifold. In this manner cool air is bypassed from the intake and passed along the side of the enclosure to be introduced at those points of highest temperature. The air flowing through the remainder of the enclosure cools as it flows over the exhaust manifold.

It will thus be obvious from the foregoing that I have provided a chamber for collecting fluid under pressure for cooling that also serves as a support for the cowling or housing and that in cooling the manifold I have also provided additional supplementary cooling for the hottest points.

I claim:

1. In auxiliary cooling means for a submerged liquid cooled internal combustion engine mounted within a housing having a hollow member connected to both the housing and the engine, means for introducing air into the chamber and ducts connected to the member and extending back over the engine to cool certain desired points whereby the member acts as both a distributor of cooling fluid and a support for the housing.

2. In auxiliary cooling means for a submerged liquid cooled internal combustion engine mounted within a circular housing, and having an annular hollow chamber secured between the engine front and the housing, air scoops connected to the chamber to conduct air thereinto, a plurality of longitudinally extending ducts which extend back over the engine connected to the chamber to conduct air for cooling to various parts of the engine, whereby the annular chamber reinforces the support for the housing and acts as an air reservoir.

3. In auxiliary cooling means for a submerged liquid cooled internal combustion engine mounted within a circular housing and having exhaust lines and spark plugs, and an annular hollow chamber mounted between the engine front and the housing, means to conduct air into the chamber, a plurality of longitudinally extending cooling ducts adjacent the exhaust lines and spark plugs and means for connecting the same to the chamber whereby the annular chamber reinforces the means to support the circular housing and also acts as an air reservoir for cooling.

CLYDE R. PATON.